United States Patent
Conrad et al.

(10) Patent No.: US 9,260,181 B2
(45) Date of Patent: Feb. 16, 2016

(54) DRIVE SYSTEM FOR A VARIABLE CAMBER AIRCRAFT WING

(71) Applicant: Liebherr-Aerospace Lindenberg GmbH, Lindenberg/Allgäu (DE)

(72) Inventors: Susanne Conrad, Meckenbeuren (DE); Werner Mangler, Leutkirch (DE); Josef Bär, Waltenhofen (DE); Bernd Schievelbusch, Lindenberg (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 0 days.

(21) Appl. No.: 14/719,901

(22) Filed: May 22, 2015

(65) Prior Publication Data

US 2015/0321750 A1    Nov. 12, 2015

Related U.S. Application Data

(62) Division of application No. 12/151,643, filed on May 8, 2008, now abandoned.

(30) Foreign Application Priority Data

May 9, 2007  (DE) .......................... 10 2007 021 748

(51) Int. Cl.
    B64C 13/28    (2006.01)
(52) U.S. Cl.
    CPC ........................................ B64C 13/28 (2013.01)
(58) Field of Classification Search
    CPC ....................................................... B64C 13/28
    USPC ............. 244/99.2, 99.3, 99.4, 99.9, 212, 213, 244/215, 216, 217
    See application file for complete search history.

(56) References Cited

U.S. PATENT DOCUMENTS

| | | | | |
|---|---|---|---|---|
| 4,260,121 A | * | 4/1981 | Baston | B64C 13/16 192/223 |
| 4,786,013 A | * | 11/1988 | Pohl | B64C 13/28 244/213 |
| 6,824,099 B1 | * | 11/2004 | Jones | B64C 13/28 244/203 |
| 7,051,975 B2 | * | 5/2006 | Pohl | B64C 9/16 244/213 |
| 7,195,209 B2 | * | 3/2007 | Schievelbusch | B64C 9/16 244/215 |
| 2004/0251382 A1 | * | 12/2004 | Schievelbusch | B64C 9/16 244/99.2 |
| 2005/0029407 A1 | * | 2/2005 | Pohl | B64C 9/16 244/221 |
| 2006/0144996 A1 | * | 7/2006 | Carl | B64C 5/10 244/99.2 |
| 2007/0051183 A1 | * | 3/2007 | Schievelbusch | B64D 45/0005 73/800 |
| 2008/0265090 A1 | * | 10/2008 | Schievelbusch | B64D 45/0005 244/99.3 |

FOREIGN PATENT DOCUMENTS

| EP | 1486416 | 12/2004 |
|---|---|---|
| EP | 20040251382 | 12/2004 |

* cited by examiner

*Primary Examiner* — Justin Benedik

(74) *Attorney, Agent, or Firm* — Dilworth & Barrese, LLP.

(57) ABSTRACT

The present invention relates to a drive system for a variable camber aircraft wing having position variable front flaps and/or rear flaps, having drive shafts, which are arranged such that that the flaps undergo a change of position in operation of the drive shafts, and having one or more drive units in driving connection with the drive shafts, wherein at least one switchable coupling is provided via which the drive shafts of two flaps of an aircraft wing can be coupled to one another.

11 Claims, 2 Drawing Sheets

DRIVE SYSTEM FOR A VARIABLE CAMBER AIRCRAFT WING

BACKGROUND OF THE INVENTION

The present invention relates to a drive system for a variable camber aircraft wing having position variable front flaps and/or rear flaps, having drive shafts arranged such that the flaps undergo a change of position in operation of the drive shafts, and having one or more drive units in driving connection with the drive shafts.

One reason for the use of variable camber aircraft wings is that a reduction in fuel consumption can be achieved by the possibility of varying the wing camber. The variation of the wing camber can be achieved, for example, by adjustment of the landing flaps in a positive and negative vertical direction around the retracted position. It is feasible for the inner and outer landing flap pairs to be adjusted differently so that different profiles result in the span direction. For this purpose, the transmission train between the inner and outer landing flaps must be separated and the drive for the outer shaft train must be coupled in.

A system of the initially named kind is known, for example, from DE 103 61 891 A1. A drive system can be seen from this reference in which the drive shafts of adjacent flaps are coupled via a differential gear which is connected to a central drive, on the one hand, and to a secondary drive, on the other hand. The speed of the drive shaft forming the output of the differential gear depends on the input speeds of the central drive as well as of the secondary drive and is thus largely independent of the speed of the drive shaft driven by the central drive.

SUMMARY OF THE INVENTION

The use of a differential gear results in a comparatively complex construction so that it is the underlying object of the present invention to further develop a drive system of the initially named kind such that it is configured reliably and has a comparatively simple structure.

This object is satisfied by a drive system having the features herein. Provision is accordingly made that a switchable coupling is provided via which the drive shafts of two flaps of an aircraft wing are coupled to one another. For example, a switchable coupling is used between inner and outer landing flaps in the transmission train. In the closed state, the flaps are, for example, moved together by a central drive; in the open state of the switchable coupling, a differential adjustment of the flaps is possible. The invention is not restricted to landing flaps, but relates to all types of flaps which can be moved into different positions relative to the wing.

Due to typical aeronautical safety demands, the couplings used in accordance with the invention are preferably designed as shape-matched transmission components.

The use of switchable, shape-matched couplings permits different system topologies which can each be adapted to specific installation demands of an aircraft. The embodiment in accordance with the invention of a drive system is less complex with respect to a solution having a differential transmission, which as a rule increases the system reliability.

A drive unit can be provided which is arranged such that, when the switchable coupling is closed, two flaps, or more than two flaps, of an aircraft wing can be moved by means of the drive shafts. This drive unit can be a central drive unit which drives the drive shafts of both aircraft wings.

In a further embodiment of the invention, provision is made for the aircraft wing to have an inwardly arranged flap and a flap arranged outwardly with respect thereto and for a brake to be provided which blocks one of the two flaps in the active state.

It is feasible to design this brake as well as the brakes of the embodiments shown in the following as so-called power-off brakes which are set in the passive state, that is, exert a braking force.

If, for example, the coupling is open and the central drive is in operation, one of the flaps can be moved, whereas the other one of the claps is blocked by the named brake.

In another embodiment of the invention, provision is made for the aircraft wing to have an inwardly arranged flap and a flap arranged outwardly with respect thereto and for a first drive unit to be provided which is arranged such that it produces a positional change of one of the two flaps, preferably of an inwardly arranged flap, in operation and with an open switchable coupling and a positional change of both flaps with a closed switchable coupling and for a second drive unit to be provided which is arranged such that it produces a positional change of the other of the two flaps, preferably of a flap arranged outwardly with respect to the inwardly arranged flap, in operation and with an open switchable coupling. The named second drive unit can preferably be operated independently of the first drive unit.

Provision is made in a further embodiment of the invention for the aircraft wing to have an inwardly arranged flap and a flap arranged outwardly relative thereto and for a drive unit to be provided which is arranged such that it produces a positional change of one of the two flaps in operation and with an open switchable coupling. This drive unit thus serves to directly carry out the positional change of a flap with an open switchable coupling. This drive unit and also the drive units of the embodiments shown in the following can be electric motors; however, the type of drive energy for the present invention is not restrictive so that other drive types can also be considered.

Provision can furthermore be made for a drive unit and for a coupling transmission connected thereto to be provided, said coupling transmission having at least two switchable couplings of which one is connected to a drive shaft of a flap and another of which is connected to the drive shaft of another flap of the wing. It is thus feasible that, for example, a central drive unit drives the two switchable couplings via the said coupling transmission, said switchable couplings driving the drive shafts of the flaps in a closed state. Accordingly, no drive of the drive shafts takes by the drive unit place when the associated switchable coupling is open. Provision is preferably made in this case for no further drive unit such as a decentralized electric motor to be provided for the positional change of the flaps. This is also not absolutely necessary since one of the flaps or also both or all of the flaps can selectively be driven via the named drive unit and the named transmission.

Provision is made in a further embodiment of the invention for a brake to be associated with each of the flaps of the wing, with the respective flap being able to be blocked by said brake. Provision can thus be made for the flap whose associated coupling is open to be fixed in its position by the respective associated brake.

Provision is made in a further embodiment of the invention for the aircraft wing to have an inwardly arranged flap and a flap arranged outwardly relative thereto, for the drive system to have at least one switchable coupling by means of which the drive shafts of the flaps can be coupled to one another and for the drive system furthermore to have a drive unit which is arranged such that it produces a positional change of the outwardly arranged flap in operation. Provision can also be made in this case for the named drive unit to be designed as an electric motor which produces a positional change of the outwardly arranged flap with an open switchable coupling.

Provision can furthermore be made for a brake to be arranged by means of which the outwardly arranged flap can be blocked. The named driving unit can be arranged centrally such that it does not only take over the positional change of the outwardly arranged flap of a wing, but of both wings.

BRIEF DESCRIPTION OF THE DRAWINGS

Further details and advantages of the invention will be explained with reference to an embodiment shown in more detail in the drawing.

DESCRIPTION OF THE PREFERRED EMBODIMENTS

Figure 1:
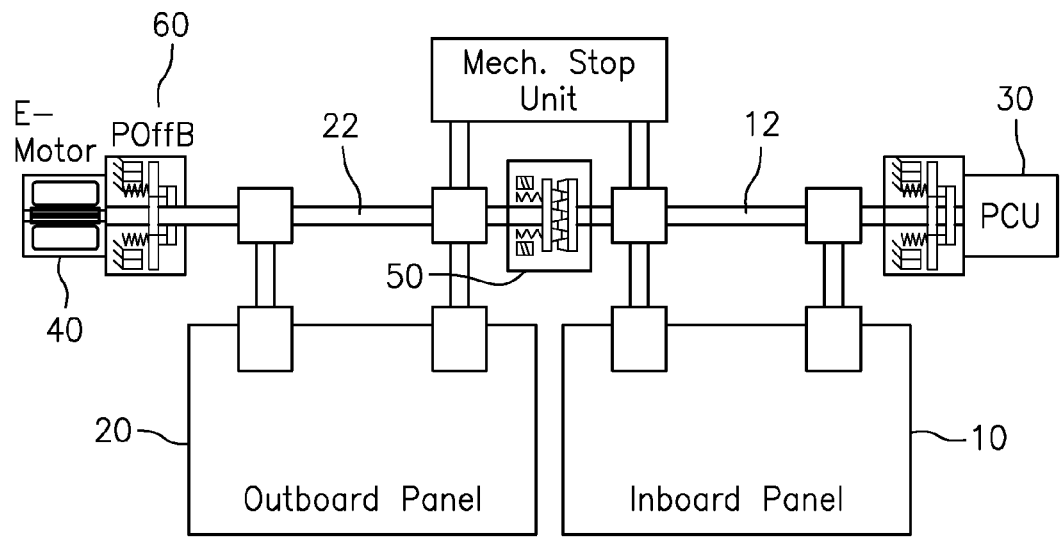
FIGS. 1 to 4 show different system topologies of drive systems in accordance with the invention.

The drive system shown in FIG. 1 consists of a central drive unit 30 by means of which both drive shafts 12, 22 of the flaps 10, 20 can be driven with a closed switchable coupling 50. In this embodiment and in the following embodiments, the flap 10 is in each case an inwardly arranged flap ("inboard panel") and the flap 20 is a flap arranged outwardly relative thereto ("outboard panel"). The central drive unit 30 serves the driving of the drive shafts 12, 22 and thus of the flaps of both wings. It includes an integrated brake as well as an integrated positional sensor.

In addition to a switchable shape-matched coupling 50 per wing, there are provided per wing: a power-off brake 60 at each of the wing tips, a respective decentral drive motor 40 at each of the wing tips as well as a positional sensor, likewise at each of the wing tips.

To control the high lift function, the switchable coupling 50 is closed, that is, deactivated, the electric motor 40 is switched off, the power-off brake 60 is activated, that is, released, and the central drive unit 30 is activated. This has the result that both flaps 10, 20 are moved into the desired position. The electric motor 40 also runs in generator operation in this case.

To activate the VC (VC=variable camber) function, the central drive unit 30 is deactivated for the adjustment of the outer flap 20 and the brake of the central drive unit 30 holds the inner flap 10 in position. The switching coupling 50 is activated, that is, opened. The same applies accordingly to the power-off brake 60. For the adjustment of the outer flap, the drive unit in the form of the electric motor 40 is now activated until the outer flap 20 has reached the desired position. The movement of the two flaps 10, 20 relative to one another is possible since the drive shafts 12, 22 are decoupled from one another by the open switching coupling 50.

If the inner flap 10 should be adjusted, the electric motor 40 is deactivated, the brake 60 is deactivated, that is, closed, and the switchable coupling 50 is activated, that is, opened. The locked brake 60 holds the outer flap 20 in position. With an open switchable coupling 50, the inner flap 10 is now moved by means of the central drive unit 30 via the drive shaft 12 into the desired position.

Figure 2:
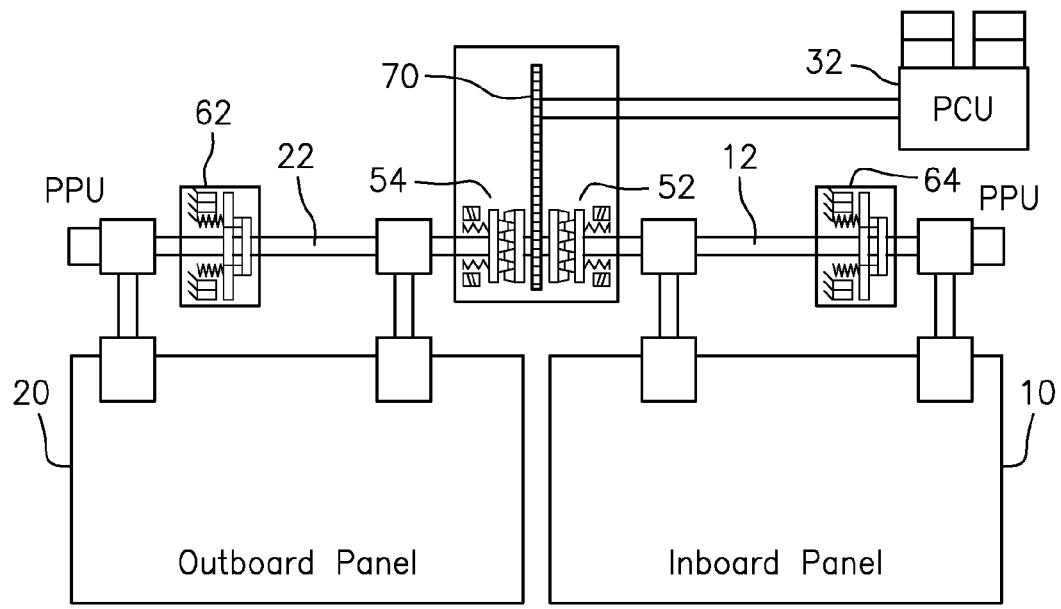

The drive system in accordance with FIG. 2 includes a central drive unit 32 in the center of the system with an integrated brake and an integrated positional sensor. The central drive unit 32 is also responsible for the operation of the drive systems of both wings in this embodiment. Respective primary transmissions extend from the drive unit 32 to the coupling transmissions 70 which are likewise present in each wing. Each of the coupling transmissions 70 has a switchable coupling 52 and a switchable coupling 54 which are associated with the respective inwardly arranged flap 10 and with the respective outwardly arranged flap 20. The operation of the flaps 10, 20 takes place via a total of four secondary transmissions, that is, two transmissions 12, 22 per wing. As can furthermore be seen from FIG. 2, power-off brakes 62 are provided at the wing tips and power-off brakes 64 are provided at the wing roots by which the flap 20 and the flap 10 respectively can be fixed in their respective positions. This likewise applies to both wings.

Two positional sensors are furthermore provided per wing at the wing tips and at the wing roots.

If both flaps 10, 20 should be moved within the framework of the high lift function, all the power-off brakes 62, 64 are activated, that is, opened, all the switching couplings 52, 54 are deactivated, that is, closed, and both flaps 10, 20 are moved for both wings via the active central drive unit 32 into the desired position.

The central drive unit 32 is activated for the activation of the VC function for the outer flap 20. The switch coupling 52 associated with the inner flap 10 is activated and therefore open. To fix the flap 10, the power-off brake 64 associated with the inner flap 10 is deactivated, that is, closed. For the adjustment of the outer flap 20, the associated power-off brake 62 is activated, that is, opened, and the switch coupling 54 associated with the outer flap 20 is deactivated, that is, closed. The drive path thus extends from the central drive unit 32 via the coupling transmission 70, the switchable coupling 54 and the drive shaft 22 to the outer flap 20.

If the inner flap 10 should be adjusted, the central drive unit 32 is likewise activated, the switchable coupling 52 associated with the inner flap 10 is deactivated, that is, closed, the brake 64 associated with the inner flap 10 is activated, that is, released, the switching coupling 54 associated with the outer flap 20 is activated, that is, open, and the power-off brake 62 associated with the outer flap 20 is deactivated, that is, closed, so that the outer flap 20 is fixed in its position.

Figure 3:
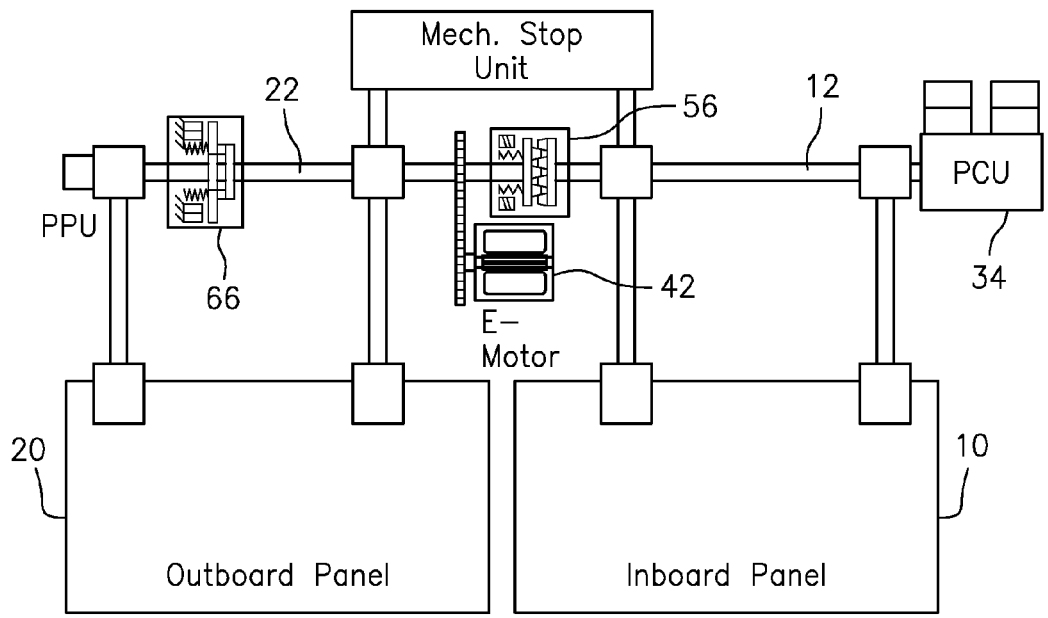

The drive system in accordance with FIG. 3 comprises a central drive unit 34 in the center of the system with integrated brake and positional sensor. One respective transmission each, that is, drive shaft 12, per wing extends from this central drive unit 34 to the coupling sites. Furthermore, one transmission each extends per wing from the coupling sites to the wing tips. They are designed in the form of drive shafts 22.

A switchable coupling 56 is respectively provided per wing, said switchable couplings being arranged between the drive shafts 12, 22 associated with the inner flaps 10 and the outer flaps 20.

Furthermore, a respective drive motor 42 is provided per wing and is designed as an electric motor and serves the drive of the respective outer flap 20.

As can furthermore be seen from FIG. 3, a respective power-off brake 66 is provided per wing and is arranged at the wing tips and has the task of locking the respective outwardly disposed flap 20. A respective positional sensor is furthermore arranged at the wing tips.

The power-off brakes 66 of the two wings are activated and therefore open to perform the high lift function. All the switching couplings 56 are deactivated and thus closed. The central drive unit 34 is set into operation and moves the system into the desired position for the adjustment of the flaps 10, 20. The drive motor 42 for the respective outer flap 20 runs along in generator operation.

The central drive unit 34 is deactivated and holds the inwardly disposed flap 10 in its position by means of the brake integrated in said central drive unit to actuate the VC function of the outer flap. The switching couplings 56 of both wings are activated and therefore open. The brakes 66 associated with the outer flaps 20 are activated and thus open and the drive units 42 respectively adjust the outer flaps 20 via the drive shafts 22.

If the inner flaps 10 should be adjusted, the central drive unit 34 is activated and adjusts the respectively inwardly disposed flaps 10. The switching couplings 56 are activated and thus open. The power-off brakes 64 associated with the outer flaps 20 are deactivated and therefore closed for the fixing of the outer flaps. The decentralized drive motors 42 are likewise deactivated.

Figure 4:
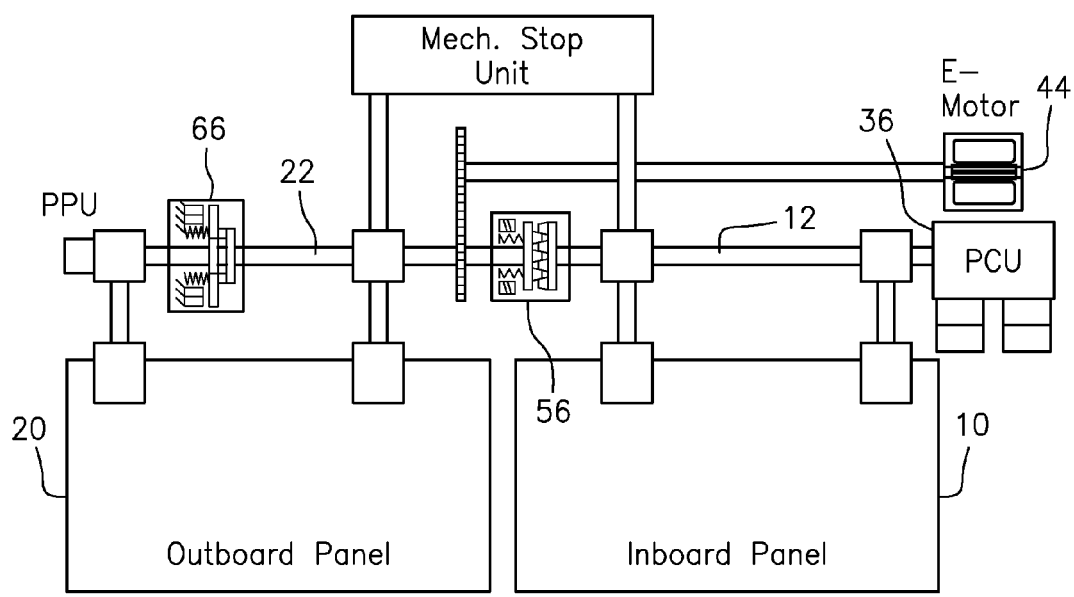

The system shown in FIG. 4 differs from the system in accordance with FIG. 3 in that a central drive motor 44 is provided at the center of the system for the VC function of the outer flaps 20. Secondary transmissions extend from this central drive motor 44 to the respective coupling transmissions of both wings. The mode of operation and the further structure otherwise correspond to that explained with respect to FIG. 3 so that reference is made accordingly.

The named functions can naturally also be performed with more than two adjacent flaps or landing flaps or even with non-adjacent flaps or landing flaps. High lift systems with only one landing flap per wing can admittedly be used for the VC function, but a span-wide differential adjustment is naturally not possible.

A demand from the certification regulations for aircraft systems FAR25 or CS25, according to which the drive systems for landing flaps should be synchronized by means of mechanical couplings if no equivalent licensed means can be used, is satisfied by means of a unit for the limiting of the positional difference between the inner and outer flaps. The positional sensors required for the high lift function and for the VC function as well as the electronic control units are not shown in the embodiment explained here.

The invention claimed is:

1. A drive system for a variable camber aircraft wing having position variable front flaps and/or rear flaps (10, 20), drive shafts (12, 22), which are connected to the flaps (10, 12) such that the flaps (10, 20) undergo a change of position in operation of the drive shafts (12, 22), and one or more drive units (30, 32, 34, 36, 40, 42, 44) in driving connection with the drive shafts (12, 22), wherein
at least one switchable coupling (50, 52, 54, 56) is provided via which the drive shafts (12, 22) of two flaps (10, 20) of an aircraft wing can be coupled to one another, and
a drive unit (32) is provided and a coupling transmission (70) connected thereto is provided which has at least two switchable couplings (52, 54) of which one (54) is connected to a drive shaft (22) of a flap (20) and another (52) is connected to the drive shaft (12) of another flap (10) of the aircraft wing.

2. A drive system in accordance with claim 1, wherein a drive unit (30, 32, 34, 36) is provided which is arranged such that it moves two flaps or more than two flaps (10, 20) of an aircraft wing with a closed switchable coupling (50, 52, 54, 56) by the drive shafts (12, 22).

3. A drive system in accordance with claim 1, wherein the aircraft wing has an inwardly arranged flap (10) and a flap (20) arranged outward relative thereto; and a brake (60, 62, 64, 66) is provided which blocks one of the two flaps (20) in the active state.

4. A drive system in accordance with claim 1, wherein the aircraft wing has an inwardly arranged flap (10) and a flap (20) arranged outwardly relative thereto; and a drive unit (40, 42, 44) is provided which is arranged such that it produces a positional change of one of the two flaps (20) in operation and with an open switchable coupling (50, 56).

5. A drive system in accordance with claim 1, wherein the aircraft wing has an inwardly arranged flap (10) and a flap (20) arranged outwardly relative thereto; a first drive unit (30, 34, 36) is provided which is arranged such that it produces a positional change of one of the two flaps (10, 20) in operation and with an open switchable coupling (50, 56) and a positional change of both flaps (10, 20) with a closed switchable coupling (50, 56); and a second drive unit (40, 42, 44) is provided which is arranged such that it produces a positional change of the other of the two flaps (20) in operation and with an open switchable coupling (50, 56).

6. A drive system in accordance with claim 1, wherein the drive system does not have any further drive unit for the positional change of the flaps (10, 20).

7. A drive system in accordance with claim 1, wherein a brake (62, 64) is associated with each of the flaps of the wing and the respective flap (10, 20) can be blocked by said brake.

8. A drive system in accordance with claim 1, wherein the aircraft wing has an inwardly disposed flap (10) and a flap (20) arranged outwardly relative thereto; the drive system has at least one switchable coupling (56) by which the drive shafts (12, 22) of the flaps (10, 20) can be coupled to one another; and the drive system furthermore has a drive unit (42, 44) which is arranged such that it produces a positional change of the outwardly arranged flap (20) in operation with an open switchable coupling (56).

9. A drive system in accordance with claim 8, wherein a brake (66) is provided by which the outwardly arranged flap (20) can be blocked.

10. A drive system in accordance with claim 8, wherein the drive unit (44) is arranged such that it produces a positional change of the respectively outwardly arranged flap (20) of both wings of an aircraft in operation.

11. A drive system in accordance with claim 1, wherein at least one of the drive units (30, 32, 34, 36) is designed with a brake and/or positional sensor.

* * * * *